United States Patent Office
2,992,270
Patented July 11, 1961

2,992,270
PROCESS FOR PRODUCING ACRYLIC ACID ESTERS
Jesse T. Dunn, Charleston, W. Va., assignor to Union Carbide Corporation, a corporation of New York
No Drawing. Filed Mar. 23, 1959, Ser. No. 800,977
2 Claims. (Cl. 260—486)

This invention relates to the production of acrylic acid esters. More particularly it is concerned with new catalysts for carrying out the interaction of acetylene, carbon monoxide and an alcohol to produce acrylic acid esters.

It is well known that acrylic acid and its esters can be produced by the reaction of acetylene and carbon monoxide with compounds having a replaceable hydrogen, such as water, alcohols, carboxylic acids, ammonia and amines, in the presence of a metal carbonyl catalyst, or other catalysts such as the complex triphenylphosphine-nickel halide compounds or the complex nickel halide-quarternary ammonium compounds.

It has now been found that the complex combinations obtained by the admixture of a nickel halide with an oxygen-containing saturated organic heterocyclic ring compound which has on the same ring carbon atom two imino radicals or substituted imino radicals (=NR) singly bonded to said ring carbon atom and forming part of the heterocyclic ring structure, or which has on the same ring carbon atom one imino radical or substituted imino radical and a sulfur atom both singly bonded to said ring carbon atom and forming part of the heterocyclic ring structure, with the other two valence bonds of said ring carbon atom being satisfied by an oxygen atom or sulfur atom not in the ring and doubly bonded to said ring carbon atom are excellent catalysts for producing acrylic acid esters; said organic heterocyclic compound must contain at least one doubly bonded oxygen atom attached to one of the ring carbon atoms. Thus, the organic heterocyclic compounds contain, in addition to oxygen, one of the groups:

$$\begin{array}{cc} \mathrm{R\ S\ R} & \mathrm{R\ O} \\ \mathrm{|\ \|\ |} & \mathrm{|\ \|} \\ \mathrm{-N-C-N-} & \mathrm{-N-C-S-} \end{array}$$

in the saturated heterocyclic ring structure.

The oxygen-containing saturated organic heterocyclic compounds which can be used to produce the catalyst complex of this invention can be represented by the general formula:

(I)
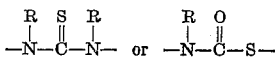

wherein (n) is an integer having a value of 2 or 3; X represents an oxygen atom or a sulfur atom; R represents a hydrogen atom or a hydrocarbyl radical, which is a radical containing hydrogen and carbon atoms only, such as an alkyl radical containing up to about 12 carbon atoms, for example, methyl, ethyl, isopropyl, n-butyl, tert.-butyl, 2-ethylhexyl, decyl, dodecyl, and the like, or an aralkyl radical, for example, benzyl, phenethyl, and the like, or a cycloalkyl radical, for example, cyclopentyl, cycloheptyl and the like or an aryl radical, for example, phenyl naphthyl, and the like, or an alkaryl radical, for example tolyl, xylyl, and the like; Y represents a sulfur atom or an imino or substituted imino radical (=NR); and R' and R'' when taken singly represent a hydrogen atom or a hydrocarbyl radical as defined above and when taken together represent an oxygen atom; and wherein said organic heterocyclic compound contains at least one oxygen atom doubly bonded (=O) to one of the ring carbon atoms.

The saturated organic heterocyclic compounds can be represented by the sub-generic general formulae:

(II)
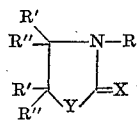

and (III)
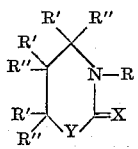

wherein R, R', R'', X and Y have the same meanings as defined above.

Typical of the compounds represented by sub-generic Formula II are the 2-imidazolidinethiones:

(IV)
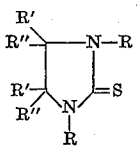

and the 2-thiazolidinones:

(V)
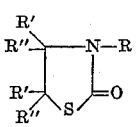

illustrative of such compounds there may be mentioned 2-thio-2,4-imidazolidinedione(2-thiohydrantoin),
1,3-dibutyl-2-thio-2,4-imidazolidinedione,
1,3-dibenzyl-2-thio-2,4-imidazolidinedione,
1,3-dicyclohexyl-2-thio-2,4-imidazolidinedione,
1,3-diphenyl-2-thio-2,4-imidazolidinedione,
3-methyl-2-thio-2,5-imidazolidinedione,
1-methyl-2-thio-2,5-imidazolidinedione,
4-methyl-2-thio-2,5-imidazolidinedione,
2-thio-1,3-ditolyl-2,4-imidazolidinedione,
2,4-thiazolidinedione,
2,5-thiazolidinedione,
3-methyl-2-thiazolidinone,
5-methyl-2-thiazolidinone,
5-benzyl-2-thiazolidinone,
5-phenyl-2-thiazolidinone,
5-cyclohexyl-2-thiazolidinone,
5-tolyl-2-thiazolidinone,
5-xylyl-2-thiazolidinone,
3-ethyl-2,4-thiazolidinedione,
3-(2-ethylhexyl)-2,5-thiazolidinedione,
3-phenyl-2-thiazolidinone,
3-(2-methoxyphenyl)-2-thiazolidinone, and the like.

Typical of the compounds represented by sub-generic Formula III are the tetrahydro-2(1H)-pyrimidinethiones:

(VI)
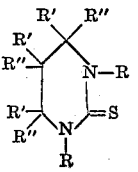

and the tetrahydro-1,3-thiazin-2-ones:

(VII) 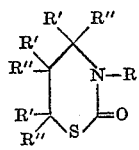

Illustrative of such compounds there may be mentioned
2 - thio - 2,4,6(1H,3H,5H) - pyrimidinetrione(2 - thiobarbituric acid),
1-methyl-2-thio-2,4,6(3H,5H)-pyrimidinetrione,
3-dimethyl-2-thio-2,4,6(5H)-pyrimidinetrione,
1,3-diphenyl-2-thio-2,4,6(5H)-pyrimidinetrione,
1,3,5-trimethyl-2-thio-2,4,6(5H)-pyrimidinetrione,
1,3-dibutyl-5,6-dihydro-2-thio-4-pyrimidinedione,
2-thio-1-tolyl-2,4,6(3H,5H)-pyrimidinetrione,
1-benzyl-2-thio-2,4,6(3H,5H)-pyrimidinetrione,
1-cyclohexyl-2-thio-2,4,6(3H,5H)-pyrimidinetrione,
Tetrahydro-1,3-thiazin-2-one,
4,5,6-trihydro-3-methyl-1,3-thiazin-2-one,
4,5,6-trihydro-3-phenyl-1,3-thiazin-2-one,
3-cyclohexyl-4,5,6-trihydro-1,3-thiazin-2-one,
3-benzyl-4,5,6-trihydro-1,3-thiazin-2-one,
4,5,6-trihydro-3-tolyl-1,3-thiazin-2-one,
3,5,6-trihydro-1,3-thiazin-2,4-dione,
3,5,6-trihydro-4-methyl-1,3-thiazin-2-one,
3,4,5-trihydro-6-pentyl-1,3-thiazin-2-one, and the like.

The catalyst complexes suitable for use in this invention are prepared by admixing a nickel halide, such as nickel bromide, nickel chloride, nickel fluoride and nickel iodide, with one or more of the above-defined oxygen-containing saturated organic heterocyclic compounds. In preparing the catalyst complex the order of addition of the two components is not critical. Thus, the heterocyclic compound can be added initially to the alcohol reactant to be used in producing the acrylic acid ester, followed by the nickel halide component, or the reverse order of addition can be followed. The acrylic acid esters are then produced by the interaction of acetylene with carbon monoxide and the alcohol at elevated temperature and under increased pressure in the presence of a catalytic amount of the catalyst complex. The use of the catalyst complexes of this invention results in a high ratio of monomer to polymer production.

The starting alcohols are preferably the aliphatic monohydroxy saturated alcohols and ether alcohols having up to about 22 carbon atoms and preferably from 1 to about 12 carbon atoms in the molecule. Illustrative alcohols are ethanol, isopropanol, tertiary butanol, pentanol, 2-ethylhexanol, dodecanol, isopropanol, ethylene glycol monomethyl ether, ethylene glycol monoethyl ether, ethylene glycol monobutyl ether, and the like.

The reaction is successfully carried out with the catalyst complexes of this invention at temperatures of from about 90° C. to about 250° C. or higher. Temperatures of from about 100° C. to about 200° C. are preferred. The reaction can be expedited by the use of slight pressures, and we prefer to operate at pressures exceeding about 100 p.s.i.g., with pressures of from about 400 p.s.i.g. to 500 p.s.i.g. most preferred. Higher pressures up to about 4000 p.s.i.g. to 5000 p.s.i.g. can be used with proper precautions.

The mole ratio of nickel halide to oxygen-containing saturated organic heterocyclic compound can be varied over wide limits and does not appear to be critical; nevertheless, we prefer to employ about equimolar amounts of each component. The total amount of catalyst complex charged to the reaction mixture is not critical and can be varied over a wide range, so long as a catalytic amount is present. When based on the alcohol charged, it has been found that a catalyst complex containing about 0.0622 mole each of the nickel halide and the organic heterocyclic compound per 16 moles of alcohol yields the highest conversions from an economical viewpoint. Higher concentrations of catalyst give a faster reaction but at greater cost; while lower concentrations, though more economical, result in lower productivity.

The reaction can be carried out in a batchwise manner or in a continuous manner by methods which are known to the art. The acetylene and carbon monoxide can be added separately, or for reasons of safety, as a mixture of gases, which mixture can be widely varied.

The following examples further serve to illustrate this invention. Parts are by weight unless otherwise specified.

*Example 1*

A three-liter stainless steel rocking autoclave was charged with 740 g. of ethanol, 13.6 grams of nickel bromide and 9.0 grams of 2-thio-2,4,6(1H,3H,5H)-pyrimidinetrione(2-thiobarbituric acid), sealed and purged, first with carbon monoxide and then with a 1:1 mixture, by volume of acetylene and carbon monoxide. The autoclave was rocked and the pressure was increased to about 40 p.s.i.g. by the further addition of acetylene-carbon monoxide mixture. The gas addition was stopped and the autoclave was heated to 100° C., at which time the pressure was increased 25 p.s.i.g. by the addition of acetylene. The total pressure was then increased to 300 p.s.i.g. with the acetylene-carbon monoxide mixture, and heating was continued to a temperature of about 150° C. At this point the pressure was increased to 450 p.s.i.g. and maintained between 400 p.s.i.g. to 450 p.s.i.g. by the periodic addition of the acetylene-carbon monoxide mixture for 4.4 hours. During this period the temperature was kept between 148° C. and 153° C. The reaction was stopped by air-cooling the autoclave and then releasing the pressure. The reaction mixture was filtered to remove solid materials and the filtrate was distilled to separate monomeric ethyl acrylate, most of which distilled as the ethyl acrylate—ethanol azeotrope, from the higher boiling acrylate esters and polymer-containing residue. The total yield of conversion to ethyl acrylate was 464 grams.

In similar manner one prepares 2-ethylhexyl acrylate by substitution of 2-ethylhexanol for ethanol.

*Example 2*

In the manner described in Example 1, 740 grams of ethanol containing 5.6 grams of mercuric bromide and 9.6 grams of butyl bromide was treated with acetylene and carbon monoxide at 165° C. to 166° C. over a 4.3 hour period in the presence of a catalyst complex prepared from 6.8 grams of nickel bromide and 4.5 grams of 2-thio-2,4,6-(1H,3H,5H)-pyrimidinetrione. The total yield of ethyle acrylate was 535 grams.

*Example 3*

In the manner described in Example 1, 740 grams of ethanol containing 3.9 grams of acetic acid was treated with acetylene and carbon monoxide at 149° C. to 158° C. over a 4.3 hour period in the presence of a catalyst complex prepared from 13.6 grams of nickel bromide and 9.0 grams of 2-thio-2,4,6(1H,3H,5H)-pyrimidinetrione. The total yield of ethyl acrylate was 471 grams.

In similar manner, ethyl acrylate is produced using a catalyst complex of nickel bromide and tetra-1,3-thiazin-2-one.

*Example 4*

In the manner described in Example 1, 740 grams of ethanol containing 5.6 grams of mercuric bromide and 9.6 grams of butyl bromide was reacted with acetylene and carbon monoxide at 164° C. to 170° C. over a 5.7 hour period in the presence of a catalyst complex prepared from 6.8 grams of nickel bromide and 3.9 grams of 2,4-thiazolidinedione. The total yield of ethyl acrylate was 470 grams.

Example 5

In the manner described in Example 1, 470 grams of ethanol containing 4.0 grams of acetic acid was reacted with acetylene and carbon monoxide at 166° C. to 186° C. over a 7 hour period in the presence of a catalyst complex prepared from 13.6 grams of nickel bromide and 7.8 grams of 2,4-thiazolidinedione. The total yield of ethyl acrylate was 336 grams.

In similar manner, ethyl acrylate is produced using a catalyst complex prepared from nickel bromide and 2-thio-2,4-imidazolidinedione.

What is claimed is:

1. In the manufacture of an acrylic acid ester by the reaction of acetylene with carbon monoxide and an alcohol at elevated temperature and under increased pressure, the improvement which comprises carrying out said reaction in the presence of a catalyst complex of a nickel halide and a tetrahydro-2-(1H)-pyrimidinethione of the general formula:

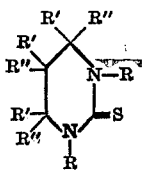

wherein R, R', and R" when taken separately are each a member selected from the group consisting of hydrogen and hydrocarbon of up to seven carbon atoms free of aliphatic unsaturation and R' and R" when taken jointly are the oxygen of a keto group, said organic heterocyclic compound containing at least one oxygen atom doubly bonded to one of the ring carbon atoms.

2. In the manufacture of an acrylic acid ester by the reaction of acetylene with carbon monoxide and an alcohol at elevated temperature and under increased pressure, the improvement which comprises carrying out said reaction in the presence of a catalyst complex of a nickel halide and a 2-thio-2, 4, 6-(1H,3H,5H)-pyrimidinetrione.

References Cited in the file of this patent

UNITED STATES PATENTS

| 2,806,040 | Reppe et al. | Sept. 10, 1957 |
| 2,854,458 | Reppe et al. | Sept. 30, 1958 |